United States Patent

[11] 3,627,883

[72] Inventors Marvin Gorman;
 Robert L. Hamill, both of Indianapolis, Ind.
[21] Appl. No. 726,575
[22] Filed May 3, 1968
[45] Patented Dec. 14, 1971
[73] Assignee Eli Lilly and Company
 Indianapolis, Ind.

[54] ANTIBIOTIC X206 FOR TREATING COCCIDIOSIS
 1 Claim, No Drawings

[52] U.S. Cl............................................................ 424/122
[51] Int. Cl........................................................ A61k 21/00
[50] Field of Search............................................ 424/122

[56] References Cited
OTHER REFERENCES

Berger et al., J. Am. Chem. Soc. 73, pages 5,295– 5,298

Shumard et al., Abstracts of Papers 7th Interscience Conference on Antimicrobial Agents and Chemotherapy, Oct. 25– 27, 1967, page 19, No. 41

The Merck Veterinary Manual, 3rd Edition, Merck and Co., Inc. Rahway, N.J., 1967, pages 1146 and 1147

*Primary Examiner*—Jerome D. Goldberg
*Attorney*—Everet F. Smith

ABSTRACT: Methods and compositions for controlling coccidiosis employing Antibiotic X206, its alkali metal, alkaline earth, and basic nitrogen salts as the active anticoccidiosis agent.

3,627,883

ANTIBIOTIC X206 FOR TREATING COCCIDIOSIS

BACKGROUND OF THE INVENTION

This invention relates generally to the prevention and treatment of coccidiosis and more particularly relates to the use of Antibiotic X206 as a coccidiostat and to novel compositions containing said Antibiotic X206 or its alkali metal, alkaline earth and basic nitrogen salts, alone or in combination with other coccidiostats.

Coccidiosis is a common and widespread poultry disease caused by one or more of several species of protozoan parasites of the genus Eimeria such as *E. tenella, E. necatrix, E. acervulina, E. maxima, E. brunetti, E. mivati, E. adenoides,* and *E. maleagrimitis*. *E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing intestinal coccidiosis. *E. maleagrimitis* and *E. adenoides* are causative organisms of coccidiosis in turkeys.

When left untreated, the severe infections of coccidiosis lead to poor weight gain, reduced feed efficiency and high mortality in fowl. The morbidity and mortality occasioned by coccidiosis infections create extensive economic loss when such infections are left untreated or unchecked. The elimination or control of this disease is, therefore, of paramount importance to the poultry raising industry.

SUMMARY

Antibiotic X206 was first reported in 1951. (Berger et al., (1951). "The Isolation of Three Antibiotics from Streptomyces." J. Am. Chem. Soc. 73: 5,295–5,298). We have now found that Antibiotic X206 and its alkali metal, alkaline earth and basic nitrogen salts are active against protozoa which cause coccidiosis and hence are useful as coccidiostats when incorporated into the diet of poultry.

It is a primary object of this invention to provide a new method for preventing and controlling coccidiosis infections in poultry. It is a further object to provide novel compositions which, when added to animal feedstuffs, are effective in preventing clinical coccidiosis. A still further object is to provide animal feedstuffs containing Antibiotic X206. Other objects will become apparent from the ensuing discussion of the invention.

DESCRIPTION OF PREFERRED EMBODIMENTS

In accordance with the present invention, we have discovered that Antibiotic X206, its alkali metal, alkaline earth, and basic nitrogen salts such as ammonium salts, methylamine, diethylamine, triethylamine, dimethylamine, and the like, are potent coccidiostats which, when administered to poultry, prevent and/or arrest the development of coccidiosis and hence are prophylactic and chemotherapeutic agents in controlling coccidiosis. Our new coccidiostats are conveniently fed to poultry as a feed component, although they may also be dissolved or suspended in the drinking water. According to a preferred embodiment, novel compositions are provided which comprise Antibiotic X206 intimately dispersed in or intimately admixed with an edible, inert, solid carrier or diluent to provide a premix or medicated food supplement. An inert, edible carrier or diluent is one that is nonreactive with respect to Antibiotic X206. The carrier or diluent is preferably one that is or may be an ingredient or animal feed.

In the practice of our invention, we prefer to employ compositions comprising a poultry feedstuff having incorporated therein an effective amount of active ingredient. The preferred compositions of our invention are feed premixes in which Antibiotic X206 is present in relatively large amounts and which are suitable for addition to the poultry feed either directly or after an intermediate dilution or bending step. Examples of carriers or diluents suitable for such compositions are animal feed ingredients such as distillers' dried grains, soybean mill run, alfalfa granules, wheat middlings, exfoliated hydrobiotites, corn meal, citrus meal, fermentation residues, ground oyster shells, Attapulgus clay, wheat shorts, molasses solubles, corn cob meal, edible vegetable substances, toasted dehulled soya flour, soybean feed, soybean mill feed, antibiotic mycelia, soya grits, kaolin, talc, crushed limestone, and the like. The preferred diluents are soybean products such as soybean mill run and soybean feed, and alfalfa products such as alfalfa granules.

The compositions can be prepared by intimately dispersing or admixing Antibiotic X206 as the pure compound, a salt, the mycelial cake or the dried broth throughout the solid, inert carrier by methods such as grinding, stirring, milling or tumbling, although, in some instances, it may be adsorbed on the carrier by spraying a solution of Antibiotic X206 into a rotating mill containing the diluent. By selecting proper diluents and by altering the ratio of carrier to active ingredients, compositions of any desired concentration can be prepared.

The feed premixes can be formulated so that the total active ingredient is present within the range of 10 percent to 80 percent by weight and the diluent or carrier present is correspondingly within the range of 90 percent to 20 percent by weight of the premix. The preferred ratio is about 40 percent by weight of Antibiotic X206 to about 60 percent by weight of the diluent. The premixes may be further diluted with an animal feed supplement or may be added directly to an animal feedstuff in order to provide a suitable medicated feedstuff which can be eaten directly by poultry.

The feed supplement may be further diluted with materials such as corn meal or soybean meal before being incorporated in the animal feed. This dilution serves to facilitate uniform distribution of the coccidiostats in the finished feed. The finished feed is one that contains a source of fat, protein, carbohydrate, minerals, vitamins and other nutritional factors.

In the treatment of coccidiosis infections, relatively low levels of Antibiotic X206 in poultry feed are sufficient to afford the poultry good protection against coccidiosis. The compound is administered to chickens in an amount equal to about 0.001 to 0.01 percent by weight of the daily feed intake. Optimum results are obtained when about 0.004 percent or 0.08 pound/ton of Antibiotic X206 is incorporated into the poultry feed. The most advantageous dosage level will, of course, vary somewhat with particular circumstances such as the type and severity of the coccidial infection to be treated, the daily feed intake of the birds, and the like.

Prior to administration of the medicated feed to poultry, the premix is uniformly dispersed in the animal feed by suitable mixing or blending procedures.

In the above discussion of our invention, emphasis has been placed in solid compositions wherein the active ingredient is mixed with an edible carrier in a premix, or in the final poultry feedstuff.

An alternative method of treatment is to administer a solution or suspension containing a therapeutically effective amount of Antibiotic X206 or one of its salts in the drinking water of the poultry. The quantity of the coccidiostat which can be administered in this fashion is, of course, limited by the solubility of Antibiotic X206 in water or by the quantity that can be suspended in the water without undue settling. Emulsifiers or surfactants can be employed in order to increase the amount of Antibiotic X206 which may be suspended in solution.

In treating poultry according to the method of our invention, 1-day-old chicks are started on the medicated feed containing Antibiotic X206. This procedure applies for both broilers and for replacement stock for layer flocks. Broiler birds are maintained on the medicated feed of this invention throughout their life, and the medicated feed is withdrawn prior to slaughter. Replacement stock for layer flocks are maintained on our medicated feed for a minimum of 12 to 14 weeks.

Generally speaking, Antibiotic X206 or one of its salts is added to a conventional basal ration which can comprise the following ingredients: meat and bone scrap; fish meal; vitamin $B_{12}$; poultry byproduct meal; dehulled soybean oil meat; dehydrated alfalfa meal; corn gluten meal; pulverized oats; ground barley; corn meal; wheat middlings; dried grain and whey fermentation solubles; methionine hydroxy analogue calcium; riboflavin; calcium pantothenate; choline chloride; niacin; animal fat; menadione sodium bisulfate; vitamin E supplement; butylated hydroxytoluene; vitamin A palmitate; D-activated animal sterol; calcium carbonate; defluorinated phosphate; salt; calcium iodate; manganese oxide; zinc oxide; cobalt hydroxide; and cobalt carbonate.

A medicated feed composition is prepared by adding Antibiotic X206 to the basal ration in an amount constituting 0.004 percent by weight of the final mixture. The ingredients are thoroughly admixed to provide the ration which is fed to young chicks.

The following examples will further illustrate the compositions of this invention.

EXAMPLE 1

Animal feed premixes having the following compositions are prepared by intimately mixing Antibiotic X206 and the particular edible solid diluent or diluents:

| Constituents | Parts by Weight |
| --- | --- |
| A. Antibiotic X206 | 50 |
| Alfalfa granules | 50 |
| B. Antibiotic X206 | 40 |
| Molasses solubles | 60 |
| C. Antibiotic X206 | 30 |
| Corn distillers' dried grains | 70 |
| D. Antibiotic X206, ammonium salt | 40 |
| Corn germ meal | 30 |
| Corn distillers' dried grains | 30 |
| E. Antibiotic X206, sodium salt | 60 |
| Soybean mill feed | 40 |
| F. Antibiotic X206, calcium salt | 20 |
| Corn distillers' dried grains | 60 |
| Wheat shorts | 20 |
| G. Antibiotic X206 | 80 |
| Wheat shorts | 20 |
| H. Antibiotic X206 | 25 |
| Soybean feed | 75 |

These premixes are made by mechanical milling or mixing of the ingredients to insure uniform distribution of the active compound.

EXAMPLE 2

A suitable medicated feed for broiler chicks can be prepared by mixing 0.004 percent by weight (0.08 pound/ton) of Antibiotic X206 into a typical starter ration having the following composition:

BROILER STARTER

| Ingredients | Percent | Lb./Ton |
| --- | --- | --- |
| Corn, yellow ground | 58.0 | 1160 |
| Soybean oil meal, solvent extracted dehulled (50 percent) | 18.0 | 360 |
| Corn gluten meal (60 percent) | 5.0 | 100 |
| Distillers' dried solubles, corn | 5.0 | 100 |
| Fish meal with solubles | 5.0 | 100 |
| Meat scraps (55 percent) | 4.0 | 80 |
| Alfalfa meal, dehydrated (17 percent) | 2.0 | 40 |
| Animal fat, beef tallow | 1.0 | 20 |
| Dicalcium phosphate, feed grade | 0.6 | 12 |
| Calcium carbonate (ground limestone) | 0.5 | 10 |
| Salt (NaCl) | 0.3 | 6 |
| Trace mineral premix AN-01 (1.05)[1] | 0.1 | 2 |
| Vitamin premix CK-01 (1.02)[2] | 0.5 | 10 |
| Total | 100.0 | 2,000 |

[1]Trace mineral premix provides per pound complete feed: manganese, 30.4 mg.; zinc, 34.0 mg.; iron, 7.7 mg.; copper, 0.8 mg.; and iodine, 0.4 mg.

[2]Vitamin premix provides per pound complete feed: vitamin A, 2,250 IU; vitamin $D_3$, 600 ICU; vitamin E, 5 IU; menadione sodium bisulfite, 0.5 mg.; riboflavin, 2 mg.; niacin, 18 mg.; pantothenic acid, 4.8 mg.; choline, 130 mg.; and vitamin $B_{12}$, 5 mcg.

After 4 weeks, the broiler chicks are changed to a suitable medicated feed which is prepared by mixing a 0.004 percent by weight of Antibiotic X206 into a typical finisher ration having the following composition:

BROILER FINISHER

| Ingredients | Percent | Lb./Ton |
| --- | --- | --- |
| Corn, yellow, ground | 62.8 | 1,256 |
| Soybean oil meal, solvent extracted dehulled (50 percent) | 28.7 | 574 |
| Animal fat, beef tallow | 5.2 | 104 |
| Dicalcium phosphate, feed grade | 1.5 | 30 |
| Calcium carbonate (ground limestone) | 0.75 | 15 |
| Salt (NaCl) | 0.25 | 5 |
| Trace mineral premix AN-01(1.05)[3] | 0.1 | 2 |
| Vitamin premix CK-01 (1.02)[4] | 0.5 | 10 |
| Methionine hydroxy analogue (90 percent) | 0.2 | 4 |
| Total | 100.0 | 2,000 |

[3]See 1 Supra.

[4]See 2 Supra.

The broilers are maintained on the above medicated diet or one comparable thereto until slaughtered.

EXAMPLE 3

To control coccidiosis in layer stocks, the chicks are started on a suitable medicated starter feed prepared by mixing about 0.004 percent by weight of Antibiotic X206 into a typical starter ration having the following composition:

CHICK STARTER (0 to 6 weeks)

| Ingredients | Percent | Lb./Ton |
| --- | --- | --- |
| Corn, yellow, ground | 55.0 | 1,100 |
| Wheat middlings | 10.0 | 200 |
| Soybean oil meal, solvent extracted dehulled (50 percent) | 19.0 | 380 |
| Meat scraps | 5.0 | 100 |
| Distillers' dried solubles, corn | 2.5 | 50 |
| Fish meal with solubles | 2.5 | 50 |
| Alfalfa meal, dehydrated (17 percent) | 2.2 | 44 |
| Whey, whole, dried | 1.5 | 30 |
| Dicalcium phosphate, feed grade | 0.5 | 10 |
| Calcium carbonate (ground limestone) | 0.75 | 15 |
| Salt (NaCl) | 0.25 | 5 |
| Trace mineral premix AN-01 (1.05)[5] | 0.1 | 2 |
| Vitamin premix CK-01 (1.02)[6] | 0.5 | 10 |
| Methionine hydroxy analogue (90 percent) | 0.2 | 4 |
| Total | 100.0 | 2,000 |

[5]See 1 Supra.

[6]See 2 Supra.

After 6 weeks, the replacement layer chicks are changed to a feed containing 0.004 percent by weight of Antibiotic X206 and having the formula:

PULLET GROWER (6 to 12 weeks)

| Ingredients | Percent | Lb./Ton |
| --- | --- | --- |

| Ingredient | Percent | Lb./Ton |
|---|---|---|
| Corn, yellow, ground | 66.0 | 1,320 |
| Soybean oil meal, solvent extracted, dehulled (50 percent) | 12.0 | 240 |
| Wheat middlings | 10.0 | 200 |
| Meat scraps | 5.0 | 100 |
| Alfalfa meal, dehydrated (17 percent) | 2.4 | 48 |
| Fish meal with solubles | 1.5 | 30 |
| Distillers' dried solubles, corn | 1.2 | 24 |
| Dicalcium phosphate, feed grade | 0.4 | 8 |
| Calcium carbonate (ground limestone) | 0.4 | 8 |
| Salt (NaCl) | 0.25 | 5 |
| Trace mineral premix AN-01 (1.05)[7] | 0.1 | 2 |
| Vitamin premix CK-01 (1.02)[8] | 0.5 | 2 |
| Methionine hydroxy analogue (90 percent) | 0.25 | 5 |
| Total | 100.00 | 2,000 |

[7] See 1 Supra.

[8] See 2 Supra.

At 12 weeks and beyond, about 0.004 percent by weight of Antibiotic X206 is combined in a typical feed having the following formula:

PULLET DEVELOPER (12 to 22 weeks)

| Ingredients | Percent | Lb./Ton |
|---|---|---|
| Corn, yellow, ground | 66.0 | 1,320 |
| Oats, ground | 15.00 | 300 |
| Soybean oil meal, solvent extracted dehulled (50 percent) | 11.00 | 220 |
| Fish meal with solubles | 2.50 | 50 |
| Alfalfa meal, dehydrated (17 percent) | 2.15 | 43 |
| Dicalcium phosphate, feed grade | 1.50 | 30 |
| Calcium carbonate (ground limestone) | 0.75 | 15 |
| Salt (NaCl) | 0.25 | 5 |
| Trace mineral premix AN-01 (1.05)[9] | 0.10 | 2 |
| Vitamin premix CK-01 (1.02)[10] | 0.50 | 10 |
| Methionine hydroxy analogue (90 percent) | 0.25 | 5 |
| Total | 100.00 | 2,000 |

[9] See 1 Supra.

[10] See 2 Supra.

EXAMPLE 4

Four groups of five 9-day-old chicks were fed a mash diet containing Antibiotic X206, at each of the concentrations indicated below, uniformly dispersed in the feed. After having been on this ration for 48 hours, each bird was infected with 200,000 sporulated oocysts of E. tenella. Four other groups of five 9-day-old chicks were fed a similar mash containing no Antibiotic X206. These were also infected after 48 hours and served as positive controls. Four other groups of five 9-day-old chicks were fed the mash diet free of Antibiotic X206 and were not infected with coccidiosis. These served as normal controls. The chickens were maintained on the above diet for 7 days. The results of the treatment were evaluated 7 days after infection. The following results were obtained:

| | Percent in feed | Percent mortality | Total weight gain (g.) | Feed efficiency | Survivor, avg. weight gain (g.) |
|---|---|---|---|---|---|
| Antibiotic X206 | 0.008 | 8 | 508 | 2.01 | 102 |
| | 0.004 | 5 | 424 | 2.65 | 93 |
| | 0.001 | 25 | 173 | 6.63 | |
| | 0.0005 | 40 | 62 | | |
| Infected control | | 32 | −58 | 3.93 | 65 |
| Normal control | | 0 | 623 | 1.68 | 124 |

It will be apparent to those skilled in the art that the coccidiostat of this invention can be incorporated into special feed concentrate and supplement formulations and finished animal feeds containing vitamins, antibiotics, growth-promoting agents, and other nutritional substances.

It will also be apparent to those skilled in the art that the coccidiostats of this invention may be used either alone or in combination with one or more other coccidiostats. That is, poultry can be treated with compositions having Antibiotic X206 or one of its slats as the sole coccidiostat or treatment can be initiated wherein Antibiotic X206 or one of its salts and one or more other coccidiostats are administered concurrently. For such purposes, Antibiotic X206 can be admixed with one or more other coccidiostats including but not limited to the following: 3,5-dinitro-o-toluamide; 3,5-dichloro-2,5-dimethyl-4-pyridinol; 1-(4-amino-2-n-propyl-5-pyrimidinylmethyl)-2-picolinium chloride; hydrochloride; ethyl 4-hydroxy-6,7-diisobutoxy-3-quinolinecarboxylate; 7-benzyloxy-6-n-butyl-3-methoxycarbonylquinol-4-one; ethyl 4-hydroxy-6-n-decyloxy-7-ethoxyquinoline-3-carboxylate; 2,4-diamino-5-(3,4-dimethoxybenzyl) pyrimidine; 2-chloro-4-nitrobenzamide; sulfaquinoxaline; other sulfa compounds; 4,4'-dinitrocarbanilide-2-hydroxy-4,6-dimethylpyrimidine complex; 3,3'-dinitrodiphenyldisulfide; arsanilic acid; 3-amino-4-hydroxyphenylarsonic acid; 5-nitrofurfural semicarbazone, and the 6,7-dialkoxy-4-hydroxyquinoxaline-3-carboxylic acid esters.

In using combined therapy, therapeutically effective amounts of Antibiotic X206 and a second coccidiostat are incorporated into the above discussed compositions. It is obvious to those skilled in the art that combined therapy may be necessary when various species of the protozoan parasites of the genus Eimeria are involved.

We claim:

1. A method for controlling coccidiosis in poultry which comprises feeding said infected poultry with an anticoccodiosis effective amount of antibiotic X-206.

* * * * *